(12) United States Patent
Koerner et al.

(10) Patent No.: US 6,326,759 B1
(45) Date of Patent: Dec. 4, 2001

(54) BALL JOINT GIMBAL SYSTEM

(75) Inventors: Steve J. Koerner, Mesa, AZ (US);
Donald G. Quist, Ridgecrest, CA (US);
William S. Wight, Ridgecrest, CA (US);
Carl M. Zorzi, Ridgecrest, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/655,386

(22) Filed: Sep. 5, 2000

(51) Int. Cl.[7] .............................. G05B 11/32; H01Q 3/08
(52) U.S. Cl. ..................... 318/625; 318/652; 74/89.22; 244/3.16; 343/766
(58) Field of Search ............................ 318/560, 575, 318/580, 584, 625, 626, 652; 74/89, 89.2, 89.22; 250/203.6; 24/3.1, 3.15, 3.16; 343/757, 763, 765, 766

(56) References Cited

U.S. PATENT DOCUMENTS

| | | | |
|---|---|---|---|
| 3,612,643 | * | 10/1971 | Weber . |
| 4,231,534 | * | 11/1980 | Lintell et al. . |
| 4,282,529 | * | 8/1981 | Speicher . |
| 4,392,140 | * | 7/1983 | Bastian et al. . |
| 4,396,919 | * | 8/1983 | Speicher . |
| 4,580,461 | * | 4/1986 | Sears et al. . |

* cited by examiner

Primary Examiner—Bentsu Ro
(74) Attorney, Agent, or Firm—David Kalmbaugh

(57) ABSTRACT

A ball joint gimbal system which provides for a precise line-of-sight stabilization of a gimballed mirror that rides on a ball and its associated support structure. The mirror is positioned by four braided lines. The brained lines are driven by four servo motor with each servo motor being coupled to one of four capstan shafts. Each of the braided lines is wound around one of the four capstan shafts. The braided lines are positioned by optical shaft encoders. The low inertia of the gimballed mirror and the positioning of the mirror by the braided lines result in an extremely accurate and fast scanning optical pointing system. Inertial gimbal stabilization of the line of sight to a target is by a stabilization algorithm utilizing body rate information from body sensors which are components of the missile for providing autopilot and navigation functions for the missile.

20 Claims, 10 Drawing Sheets

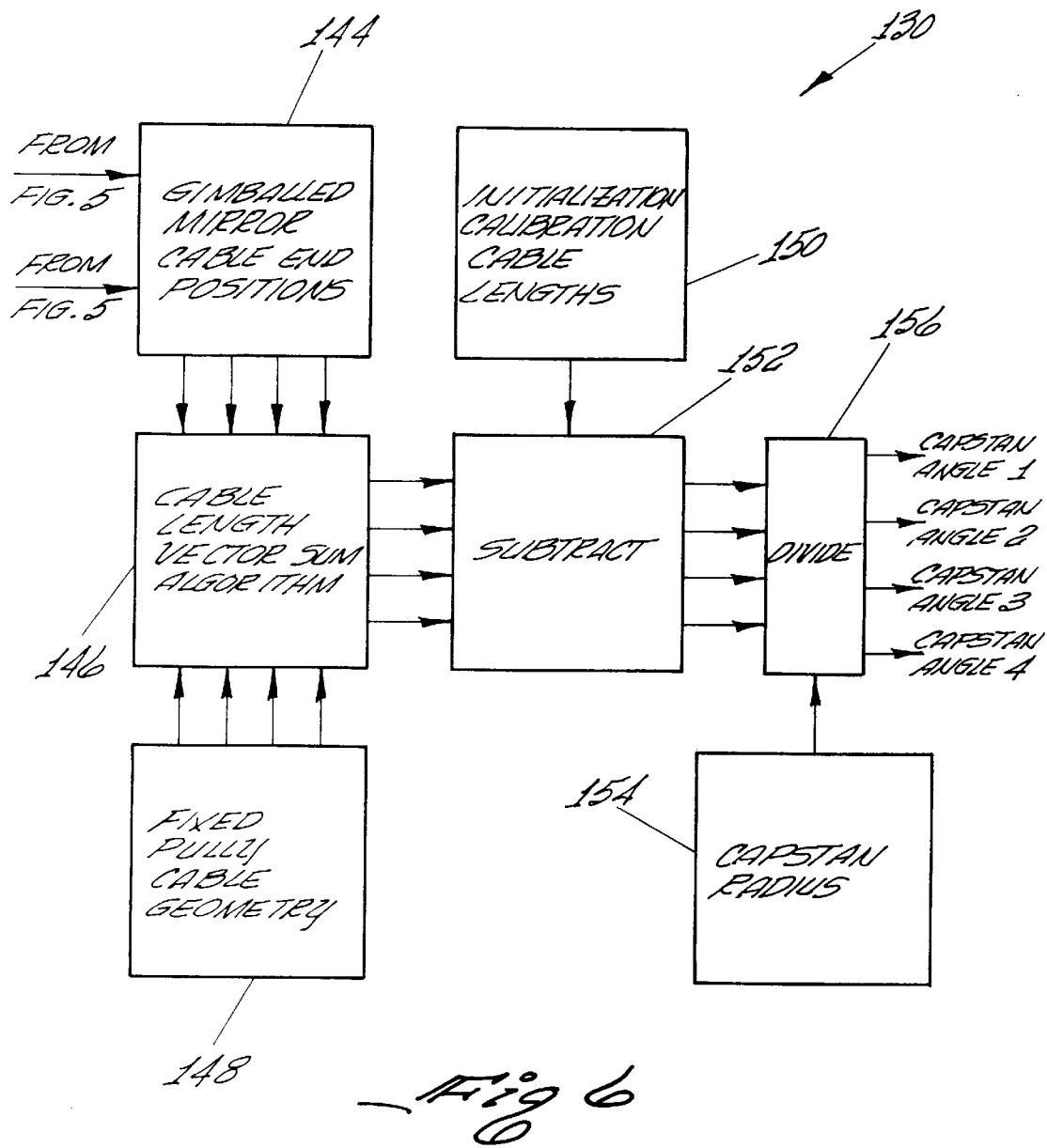

BALL JOINT GIMBAL SYSTEM

BACKGROUND OF THE INVENTION

1. Field of the Invention

The present invention relates generally to missile tracking systems for tracking a target. More specifically, the present invention relates to a ball joint gimbal system for steering a gimballed mirror which is tracking a target.

2. Description of the Prior Art

A gimbal on a missile's seeker is used to establish a line of sight vector between a target and the missile's seeker. A visible or infrared sensor and associated optics are mounted on the gimbal. A narrow instantaneous field of view provides for long range tracking capability by the missile's seeker. The motion of the gimbal provides for a large angle of regard to accommodate the need for target acquisition which is off boresight. The image received by the seeker is stabilized in inertial space to decouple missile body motion which reduces blur. The gimbal is movable in elevation and azimuth so that closed loop tracking occurs. The angular rate of motion of the gimbal is measured to facilitate closed tracking.

Generally gimbals allow for orthogonal elevation and azimuth motion by including an inner gimbal platform, a gimbal ring and an outer gimbal fork. The inner gimbal platform has a number of components mounted thereon including an imager and its associated optical elements such as a mirror, lens or prism which provide the image. Rate or free gyros are mounted on the inner platform to provide inertial stabilization for the gimbal. A gimbal IR sensor has a cryogenic cooler.

A gimbal ring is attached to the inner gimbal platform on a shaft to allow for rotary motion of the gimbal. A torque motor and angle transducer are attached to this shaft. An orthogonal shaft attaches the gimbal ring to the outer gimbal fork. A second torque motor and associated angle transducer are attached to this orthogonal shaft. In addition, wires and cooling lines run across the gimbal axes. This causes a coupling between the axes so that body motion isolation is difficult to achieve.

The gimbal structure is complex and the mechanical components are very precise. The conventional gimbal is therefore very expensive and also large and heavy making it difficult to mount in the confined space of a seeker.

Accordingly, there is a need for a low cost, yet highly effective gimbal which is adapted for use with a missile's seeker.

SUMMARY OF THE INVENTION

The present invention overcomes some of the difficulties of the prior art including those mentioned above in that it comprises an inexpensive yet very accurate system for steering a gimballed mirror which is tracking a target being pursued by a missile in flight.

The ball joint gimbal system of the present invention provides for a precise line-of-sight stabilization of a gimballed mirror that rides on a ball and its associated support structure. The mirror is positioned by four braided lines. The brained lines are driven by four servo motor with each servo motor being coupled to one of four capstan shafts. Each of the braided lines is wound around one of the four capstan shafts. The braided lines are positioned by optical shaft encoders. The low inertia of the gimballed mirror and the positioning of the mirror by the braided lines result in an extremely accurate and fast scanning optical pointing system. Inertial gimbal stabilization of the line of sight to a target is by a stabilization algorithm utilizing body rate information from body sensors which are components of the missile for providing autopilot and navigation functions for the missile.

BRIEF DESCRIPTION OF THE DRAWINGS

FIGS. 5 and 6 illustrate a block diagram of a system for calculating a length for each of the four braided lines which steer the gimballed mirror of FIG. 1;

FIG. 7 is a proximal time optimal servo diagram to implement filtering of the pitch and yaw commands from the missile's body rate sensors;

DETAILED DESCRIPTION OF THE PREFERRED EMBODIMENT

Figure 1:
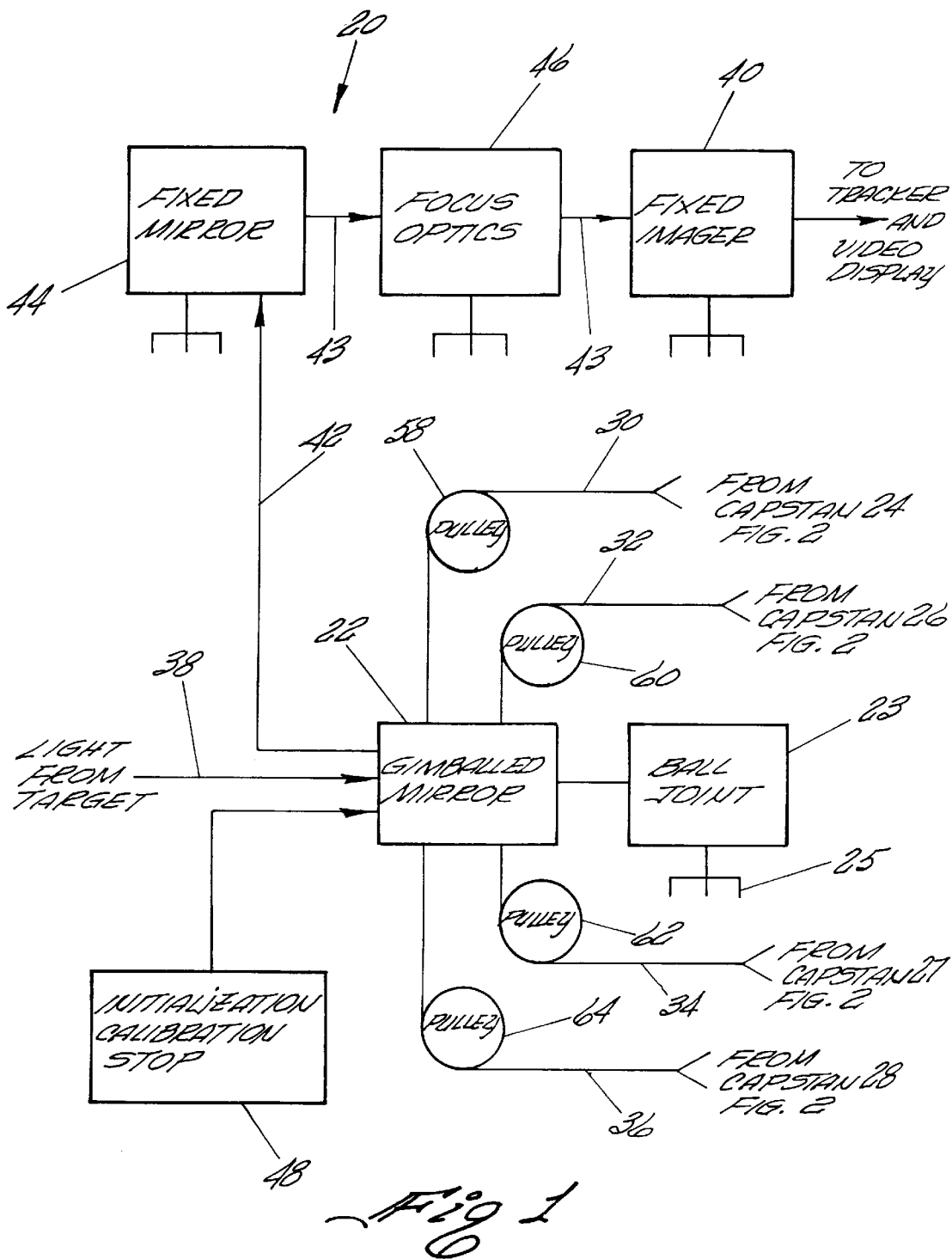
FIGS. 1 and 2 illustrate a block diagram of the ball joint gimbal system comprising the present invention.
Figure 2:
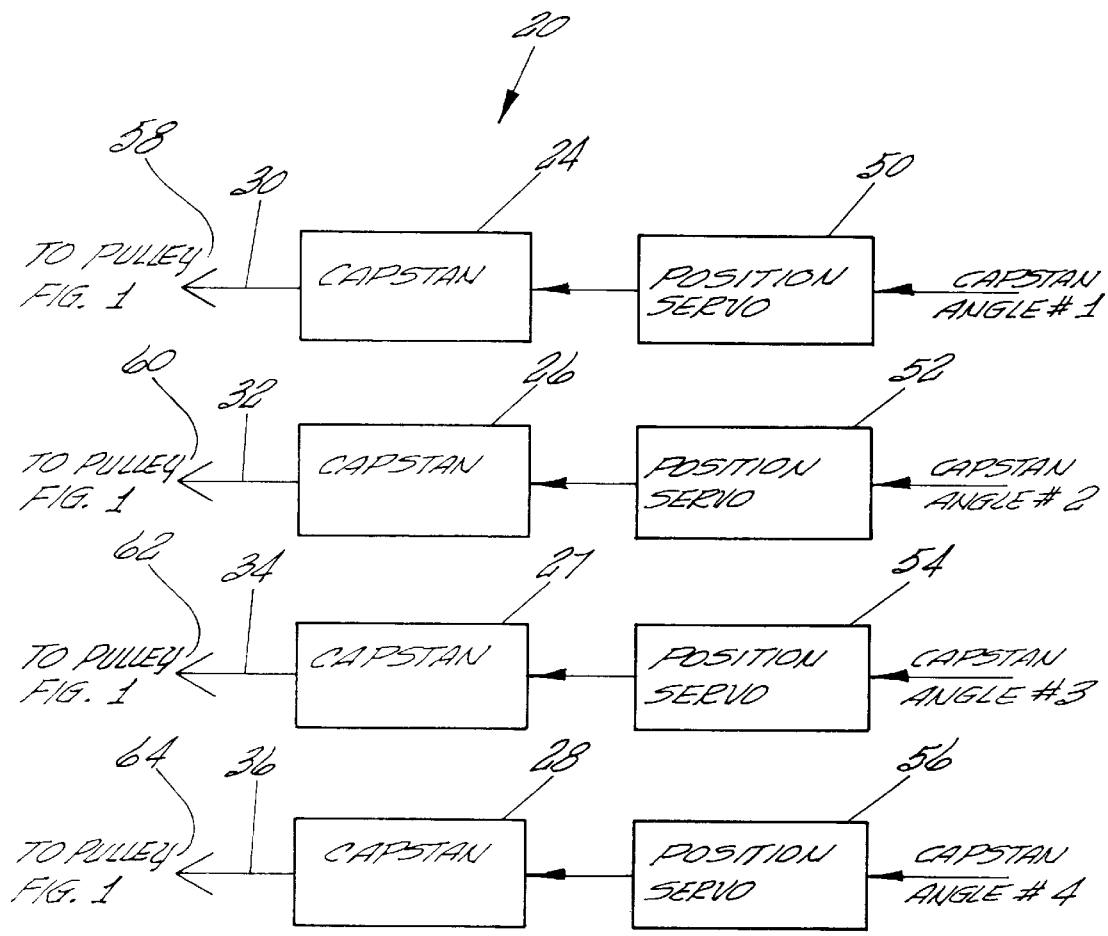

Referring to FIGS. 1 and 2, there is shown a ball joint gimbal system, designated generally by the reference numeral 20. A gimballed mirror 22 is attached to a seeker body with a ball joint 23 and its associated support structure 25. Ball joint 23 provides the mirror with an infinite set of mechanical axes to rotate around. Four servo driven capstans 24, 26, 27 and 28 rotate the mirror with four kevlar lines 30, 32, 34 and 36 which move an optical line of sight vector 38. A target image is formed on a stationary or fixed imager 40 by reflecting the light off the gimballed mirror 22 along optical path 42 to fixed mirror 44 and then along light path 43 through focus optics 46 to fixed imager 40. The image of the target is stabilized in inertial space by using the electrical signals from missile body mounted rate gyros 70, 72 and 74 (FIG. 3) to cause mirror 22 to move the correct amount to compensate for the motion of the missile. Support structure 24 for gimballed mirror 22 includes a steel post which has one end attached to the body of the missile's and the other end attached to ball joint 23. A 0.250 inch precision ground steel ball comprises ball joint 23. The steel ball has a hole drilled part way into the steel ball. This hole allows the steel ball to be press fit onto the steel post. A ball socket, attached to the back side of mirror 22 couples the ball joint 23 to mirror 22. The ball socket was machined, coated with a dry film lubricant and lapped to the ball to reduce ball/socket friction.

A flat front silvered mirror of sufficient size to maximize the optical aperture yet small enough to fit in the available space is attached to the socket and assembled onto the ball joint 23. The mirror 22 has a 3.5 inch diameter mirror and is fabricated from 0.375 inch piece of aluminum. A socket retainer prevents the socket from separating from the ball during non operational status.

Referring again to FIGS. 1 and 2, four angular position servos 50, 52, 54 and 56 are attached in to the missile's seeker body. Precision capstans 24, 26, 27 and 28 are respectively attached to the shaft of precision servos 50, 52, 54 and 56. One end of kevlar line 30, 32, 34 or 36 is attached and wound around each precision capstan 24, 26, 27 or 28. The other end of each line 30, 32, 34 and 36 is attached to the back side of the gimballed mirror 22 at a different location on the backside of gimballed mirror 22. Each line 30, 32, 34 or 36 runs over a pulley 58, 60, 62 or 64 positioned to provide a geometry to pull on both the mirror and the capstan. The pull on the capstans 50, 52, 54 and 56 is at a slight angle to keep the cable lay tight. The pull on mirror 23 is at a substantial angle such that appropriate tension in kevlar lines 30, 32, 34 and 36 provide control in pitch, yaw and roll.

Kevlar lines 30, 32, 34 and 36 are 8×195 denier braided KEVLAR 49 lines. The kevlar lines 30, 32, 34 and 36 exhibit the properties of a high modulus of elasticity so that the lines 30, 32, 34 and 36 will not stretch and yet be flexible so that minimal force normal to each line 30, 32, 34 and 36 is needed to wind and unwind the lines 30, 32, 34 or 36 around its associated capstan and pulley.

As each of the position servos 50, 52, 54 and 56 is commanded by a capstan angle signal supplied to the position servo, mirror 22 moves in a controlled direction at the required angle to track the target. An initialization calibration stop 48 is provided so that the mirror capstan angles can be initialized at system start up.

The kevlar lines 30, 32, 34 and 36 are attached to the gimballed mirror 22 at a distance from the center of ball joint 23 that is a factor of ten greater than the radius of the capstans 24, 26, 27 and 28. This causes the shaft of capstans 24, 26, 27 and 28 to move through an angle which is ten times greater than the mirror. Since the kevlar lines 30, 32, 34 and 36 don't stretch, gimballed mirror 22 can be controlled in angle ten times more accurately than the angle measurement of the servo shafts by the shaft encoders. This allows for a low cost design of the ball joint gimbal by allowing for the use of low cost shaft encoders within position servos 50, 52, 54 and 56.

Fixed mirror 44 is attached to the missile's seeker body. Light from a scene or target reflects off of gimballed mirror 22 travels along optical path 42 to fixed mirror 44 and is reflected from fixed mirror 42 to focus optics 46 which collects and focuses the light onto a fixed imager 40. Fixed imager 40 may be an infrared imager or a visible imager. Both the focus optics 46, which may be a lens and imager 40 are attached to the seeker body. As gimballed mirror 22 is moved by the kevlar lines 30, 32, 34 and 36, the line of sight vector 38 between the missile's seeker and target is also moved.

Electrical and/or cooling lines are not in proximity with or located across the ball joint 23. Only the gimballed mirror 22 moves with respect to the seeker body. Due to the gimballed mirror's reflection of light or infrared, the seeker line of sight vector 38 moves at twice the angle of mirror 22.

Figure 3:
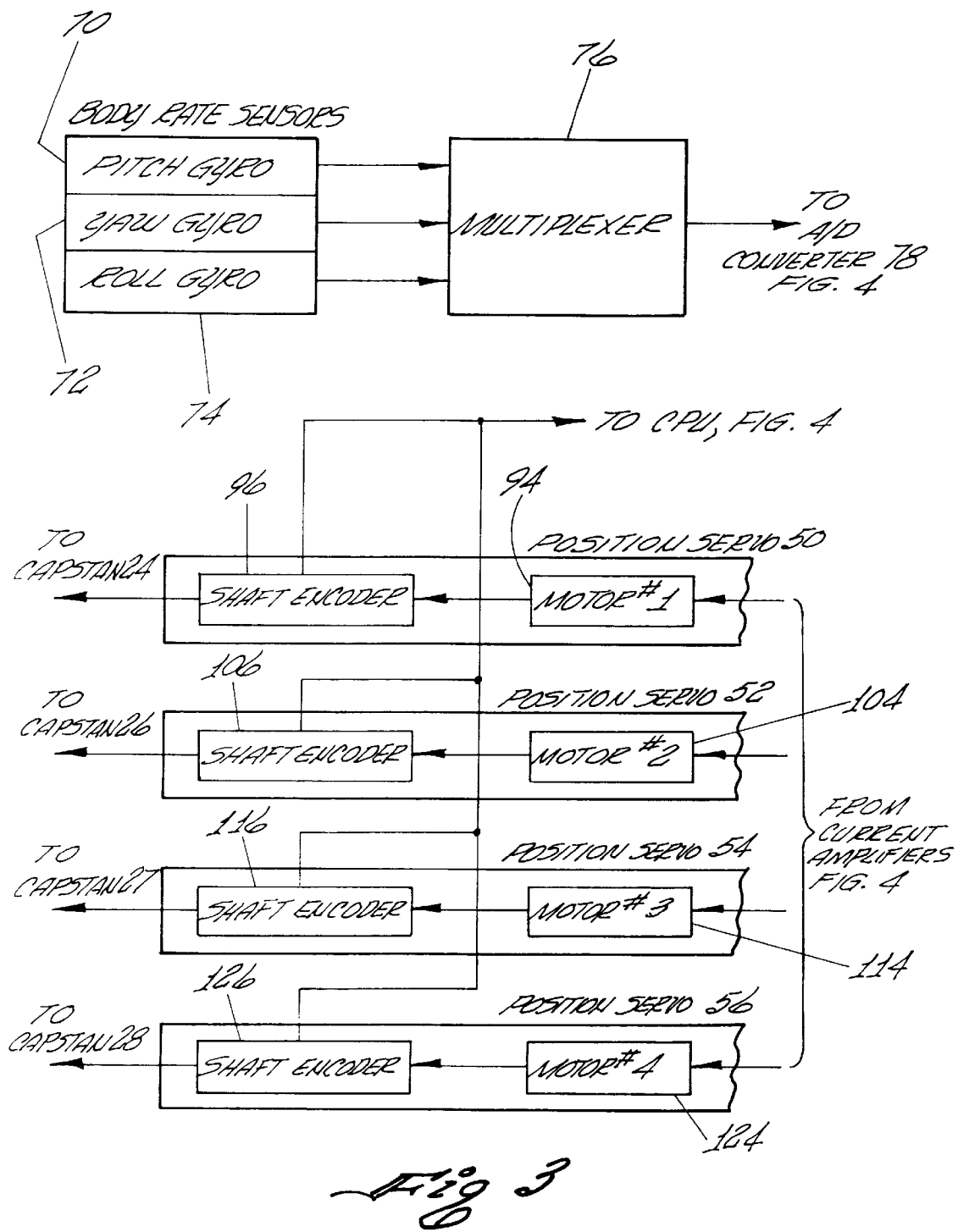
FIGS. 3 and 4 illustrate a block diagram of the mirror controller for the gimballed mirror of FIGS. 1 and 2.
Figure 4:
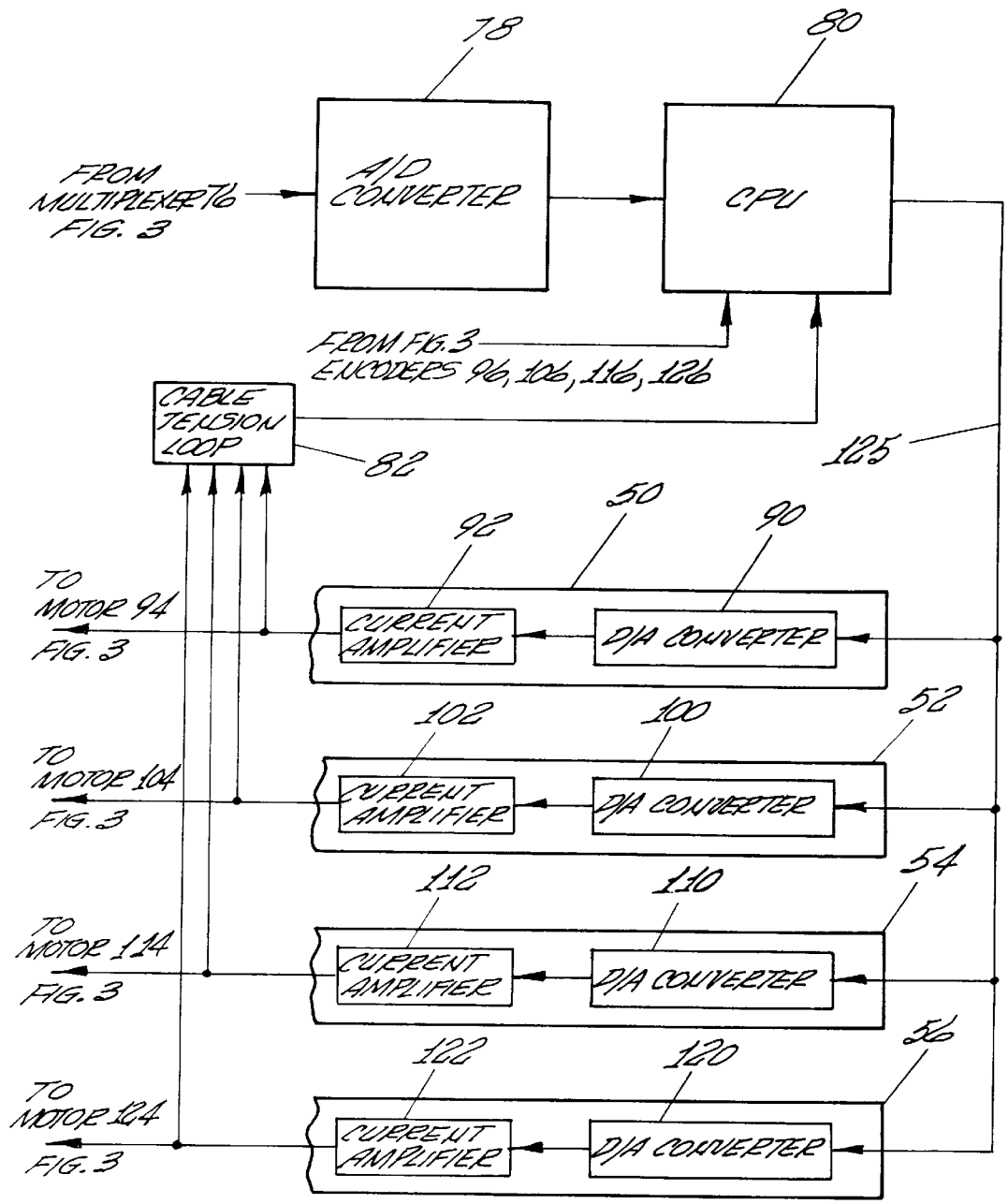
Figure 5:
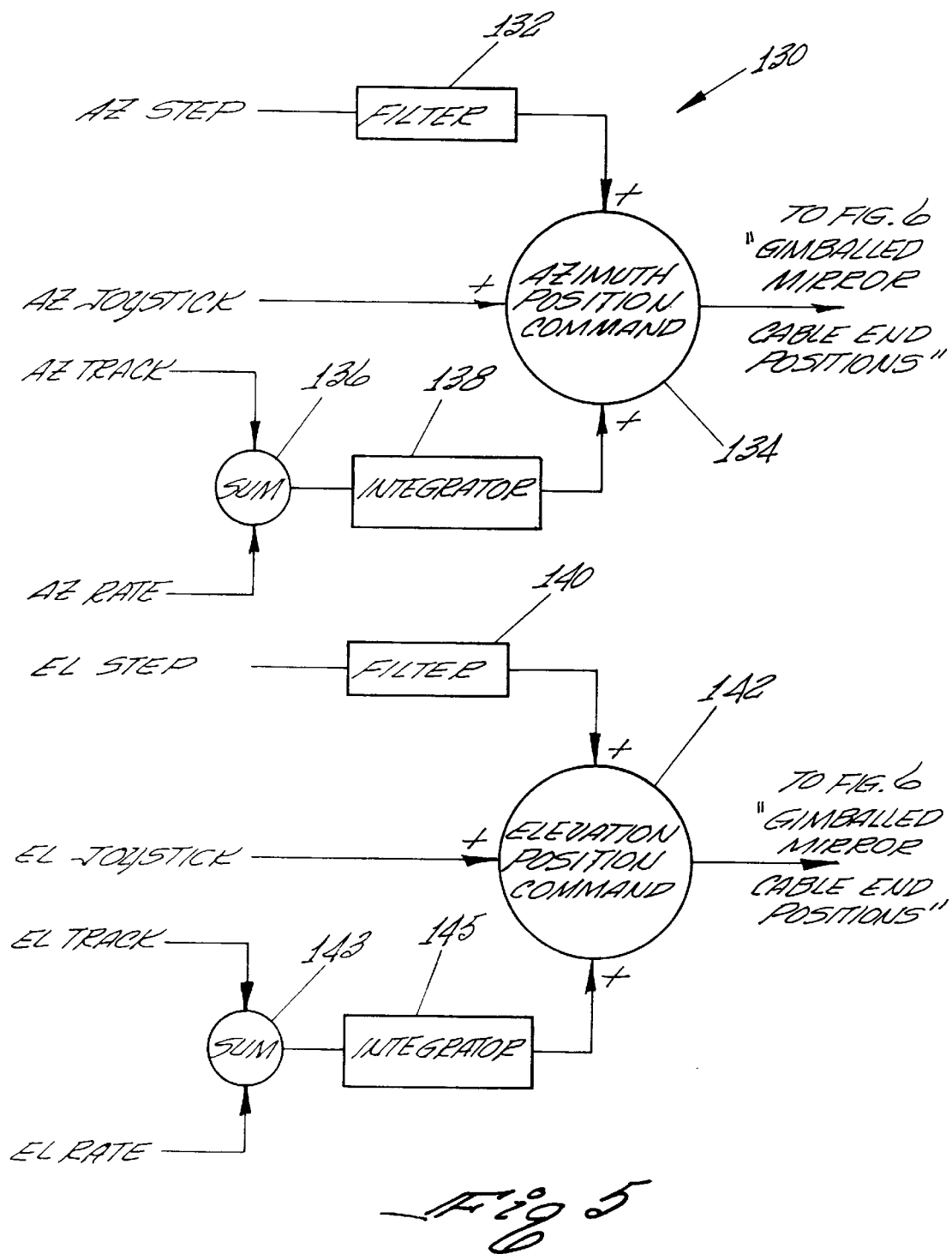
Figure 1:
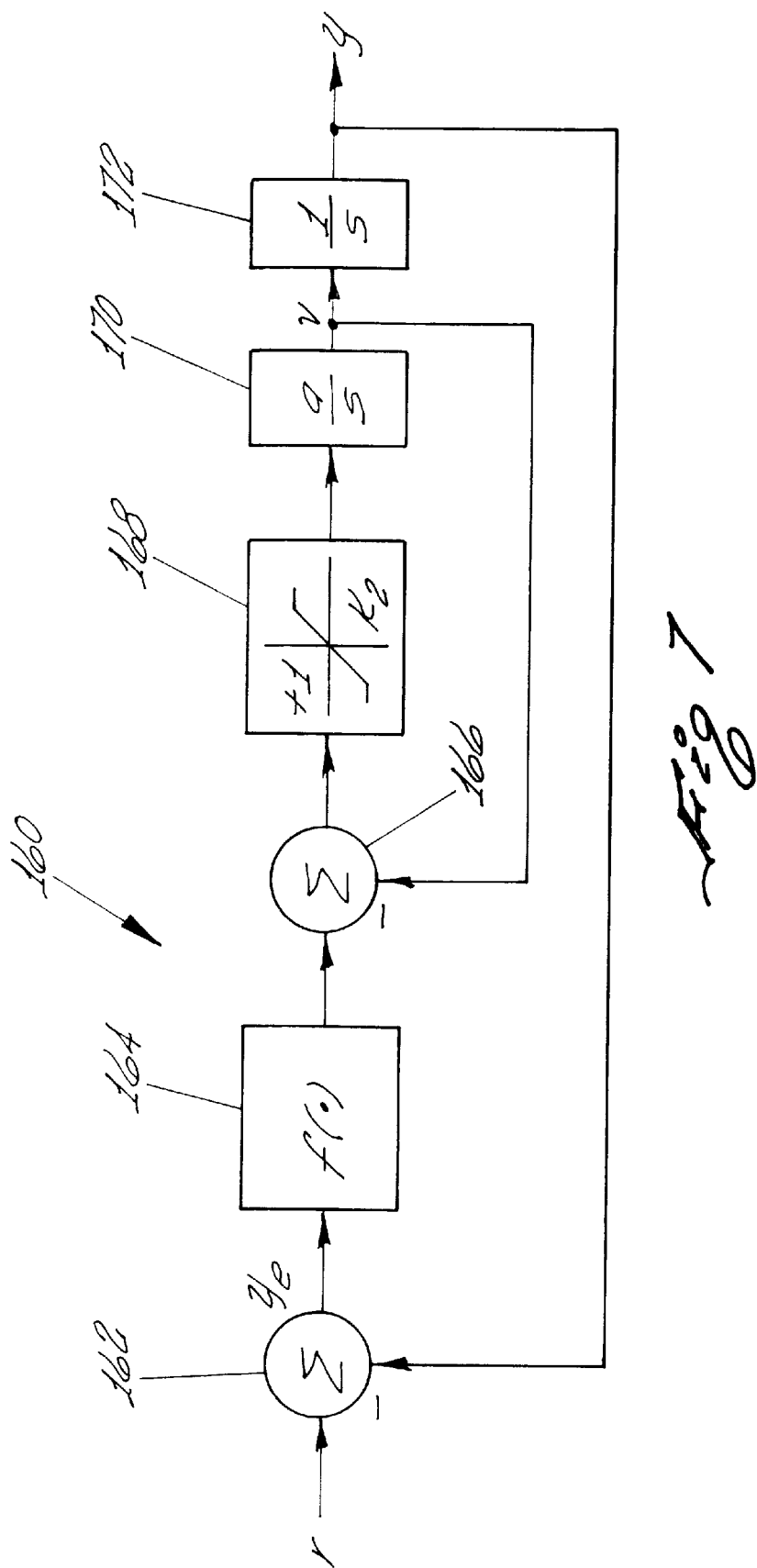

Referring to FIGS. 3 and 4, each position servo 50, 52, 54 and 56 comprises a digital to analog converter connected to a current amplifier which is connected to a servo motor. The shaft encoder is integral to the servo motor. Position servo 50 includes digital to analog converter 90, current amplifier 92, servo motor 94 and shaft encoder 96. Position servo 52 includes digital to analog converter 100, current amplifier 102, servo motor 104 and shaft encoder 106. Position servo 54 includes digital to analog converter 110, current amplifier 112, servo motor 114 and shaft encoder 116. Position servo 56 includes digital to analog converter 120, current amplifier 122, servo motor 124 and shaft encoder 126.

At this time it should be noted that the four motor/encoders are model CM325-2048-NAW-2 motor/encoders commercially available from Computer Optical Products of Chatsworth, Calif. The integral shaft optical encoders 96, 106, 116 and 126 provide 2048 counts/per revolution of the motor's shaft with quadrature sinewave output signals and an index pulse. The optical encoder is specifically designed to be used as a continuous feedback device in servo loop applications.

The servo motors 94, 104, 114 and 124 rotate in both the clockwise and counterclockwise direction. Rotation of the servo motors 94, 104, 114 and 124 respectively rotates the capstans 24, 26, 27 and 28. This, in turn, results in a constant adjustment of the length of each of the braided lines 30, 32, 34 and 36 causing rotational movement of gimballed mirror 22 around ball joint 28. The servo motors 94, 104, 114 and 124 in combination with capstans 24, 26, 27 and 28 and braided lines 30, 32, 34 and 36 steer gimballed mirror 38.

The feedback control loop is provided by the digital signal processing unit 80 which may a digital computer. The control loop compensation is implemented in digital algorithms. The four capstan angle commands (capstan angle 1, capstan angle 2, capstan angle 3 and capstan angle 4) are supplied to each of the digital to analog converters 90, 100, 110 and 120 from computer 80 via a multiplexed data bus 125. The shaft encoders and the servo motors can be low cost. The large capstan shaft angles required by the combination of the gimballed mirror 22 and capstans 24, 26, 27 and 28 allow motors 50, 52, 54 and 56 which have minimal torque requirement and a small number of poles to be used. This type of motor is generally of a lower cost than the pancake torque motor required on conventional gimbal systems.

The four kevlar lines or cables 30, 32, 34 and 36 are arranged in a symmetrical pattern. Since motor torque is directly proportional to motor current, cable tension is controlled in a control loop which keeps the total motor current constant over a long time constant.

Referring now to FIGS. 1, 2, 5 and 6, there is no mechanical elevation and azimuth axis in the ball joint gimbal system 20. The gimballed mirror 22 is free to move generally in any direction. Vertical motion and horizontal motion are nodes that exist only in a digital computer control system 130 which reside in computer 80. A plurality of gimbal drive signals/commands are presented to system 130 in reference to the vertical and horizontal axes of the missile's seeker body. These signals/commands are summed by a pair of summers 134 and 142 into a composite azimuth gimbal position signal/command and elevation gimbal position signal/command. The signals provided to summer 134 include (1) an azimuth step signal which is filtered by a filter 132; (2) an azimuth joystick signal; and (3) an azimuth track signal which is summed with a azimuth rate signal and then integrated by an integrator 138 prior to being supplied to summer 134. In a like manner, the signals provided to summer 142 include (1) an elevation step signal which is filtered by a filter 140; (2) an elevation joystick signal; and (3) an elevation track signal which is summed with a elevation rate signal and then integrated by an integrator 145 prior to being supplied to summer 142.

A matrix vector calculation is then performed by the digital computer 80 to determine the required position of the four cable ends of cables 30, 32, 34 and 36 with respect to the center of gimbal ball 23 (block 144). The vector positions of the pulleys 58, 60, 62 and 64 with respect to the center of gimbal ball 23 is known (block 148). A vector matrix sum is then performed by digital computer 80 to determine the required length of each cable 30, 32, 34 and 36 from its associated capstan 24, 26, 27 or 28 to the gimballed mirror 22 (block 146). The change in cable lengths of cables 30, 32, 34 and 36 required is next computed by subtracting (block 152) the cable lengths at boresight that were determined in the initialization sequence at start up (block 150). Each cable length change is converted to capstan angle change by dividing the cable length by the capstan radius (block 156). These capstan angle signals are then supplied to the four position servos 50, 52, 54 and 56. This is a repetitive process with the calculation being made 300 time per second.

As the gimballed mirror 22 is moved errors will occur in the capstan angle calculations due to errors in the components of unit 20 such as individual capstan diameter, pulley concentricity, etc. These errors are continuously accounted for by a cable tension loop. Small symmetrical capstan angle adjustments are made by an algorithm which keep all four lines 30, 32, 34 and 36 in constant equal tension.

Stabilization of the target line of sight vector 38 with respect to inertial space is also provided. Three rate gyros consisting of pitch gyro 70, yaw gyro 72 and roll gyro 74 are affixed to the missile's seeker body. These gyros 70, 72 and 74 operate as the rate transducers associated with the inertial navigation unit or autopilot of the missile. These gyros 70, 72 and 74 therefore not be a cost factor. The three orthogonal body rate signals from gyros 70, 72 and 74 are multiplexed by a multiplexer 76 and supplied to the central processing unit 80. Central processing unit 80 calculates the body rate vector with respect to inertial space.

The missile's seeker has the mirror line of sight vector with respect to the body. It is computed as the vector which bisects the angle between the target line of sight vector 38 and a vector from the gimballed mirror 22 to the fixed mirror 44. The mirror line of sight vector is differentiated and coordinate transformed to establish the azimuth and elevation mirror line of sight rates with respect to the seeker body as a function of the body rates with respect to inertial space. The azimuth rate and elevation rate signals are supplied to the mirror controller. When the seeker body undergoes pitch or yaw rotation the controller moves the gimballed mirror 22 the appropriate amount to keep the target image stationary on the imager 40. The mirror controller includes those elements which move the gimballed mirror 22 such as angular position servos 50, 52, 54 and 56; their associated servo driven capstans 24, 26, 27 and 28; and kevlar lines 30, 32, 34 and 36.

Referring to FIGS. 1, 2, 7, 8 and 10, ball joint gimballed system 20 comprises four independently controlled servo systems coupled only through the lines 30, 32, 34 and 36 to a common inertial load, the gimballed mirror 22. These four servo system function to precisely position the gimballed mirror 22 in pitch, yaw, and roll coordinates, and also to maintain roughly equal tension in the four kevlar lines 30, 32, 34 and 36, which draw the gimballed mirror 22 back against the ball joint 23.

The position control of the mirror 22 is accomplished using a vector transformation of the mirror 22 normal at the proper pointing angles in yaw and pitch to four "string vectors." These four vectors have magnitudes that are the required length of each of the four kevlar lines 30, 32, 34 and 36 to achieve the correct pointing angle of the mirror 22 and certain directional components. These directional components lay in the direction of the kevlar lines 30, 32, 34 and 36 tensioned between the mirror attachment points and their respective capstans 24, 26, 27 and 28 mounted on the motor shafts of motors 94, 104, 114 and 124. By transforming the gimballed mirror yaw, pitch, roll commands to line length commands, the complex technique required to position gimballed mirror 22 is reduced to four single-axis control loops. These four loops function as if the loops are tightly coupled in order to generate a predictable trajectory as mirror 22 is stepped from one position to another. Requirements exist for the following functions: (1) the tension for lines 30, 32, 34 and 36 must be maintained precisely during movement of the mirror 22 so that no line is slack at any time, (2) the gimballed mirror normal must be precisely controlled by the length of the four servo systems, and (3) the force component of mirror 22 acting against ball 23 must be directed along the axis of the post of support structure 25 supporting ball 23.

To satisfying these requirements a control system is needed that is sufficient to meet the requirements for positioning accuracy in the presence of static friction of ball 23 acting on the ball socket attached to the back side of mirror 22, while simultaneously avoiding non-linearities; e.g., saturation, which would cause a loss of coordination during movement. Saturation in any axis or axes will result in line slacking, which is an immediate indication that the position of the mirror normal is incorrect. Additionally, rapid retensioning following a slack condition causes dynamic loading of the kevlar lines 30, 32, 34 and 36, which will break or fray the lines 30, 32, 34 and/or 36. Smooth, coordinated motion between the four servo systems is essential to reliable, accurate positioning of mirror 22.

The design criteria that were utilized during development of the positioning servos are (1) acceleration will not be commanded that will cause a preset current limit to be exceeded, and (2) velocity will not be commanded that will cause the back EMF of the motors 94, 104, 114 and 124 to exceed the maximum voltage capability of the outputs of servo amplifier 92, 102, 112 and 122. The simultaneous application of these requirements to each of the four independent line servo systems since a command modification or filtering needs to be applied to the pitch and yaw commands before the transformation to line length commands.

A proximal time optimal servo (PTOS) technique implements filtering of the pitch and yaw commands. The PTOS technique achieved a time optimal response for arbitrarily large step changes in angle without sacrificing small signal bandwidth. PTOS parameters were calculated for all variants of the seeker configurations.

The PTOS technique is used because the technique permits commanding mirror angles to step between two positions within a time optimal fashion. PTOS limits the acceleration of these commands so that current limits will never be exceeded regardless of the servo error, thus eliminating the ambiguity of control between the four line servo systems. Control is possible because the nonlinear nature of the error signal processing within the PTOS function enables the sign of the error signal to reverse in sufficient time to decelerate the inertia of the load to zero. The rational for this approach is that PTOS is independent of the velocity at reversal; i.e., at high velocities error signal reversal occurs further away from the commanded position than it would for low velocities, thus "adapting" for the extra time needed to decelerate the load at the maximum acceleration possible without saturating the control system.

FIG. 7 shows a double integrator system configured for PTOS by implementing the following equations:

$$\dot{y}=v_1 \tag{1}$$

$$\dot{v}=a \cdot sat\{k_2[f(y_c)-v]\} \tag{2}$$

The saturation function 164 (FIG. 3) is expressed in the following equation:

$$f(y_e) = \begin{cases} \frac{k_1}{k_2}(y_e), & |y_e| \leq y_1 \\ sgn(y_c)\left[(2a\alpha|y_e|)^{\frac{1}{2}} - \frac{1}{k_2}\right], & |y_e| > y_1 \end{cases} \quad (3)$$

where a is the maximum acceleration allowed

α is the acceleration discount factor (0<α<1) to accommodate uncertainty in the plant acceleration $y_l$ is the size of the linear operating region For f($y_c$) to remain continuous in the boundaries of the linear range $y_l$, $k_1$ and $k_2$ are constrained as follows:

edrnrnposssibleconsistantstaboliz∈gprescence ABTSRACTrcapstaint and $$k_1 = \frac{1}{y_1} \quad (5)$$

The maximum acceleration and the linear operating regions are found by system measurements and the acceleration discount is selected by measuring current waveforms during peak accelerations under worst case loading conditions.

Figure 8:
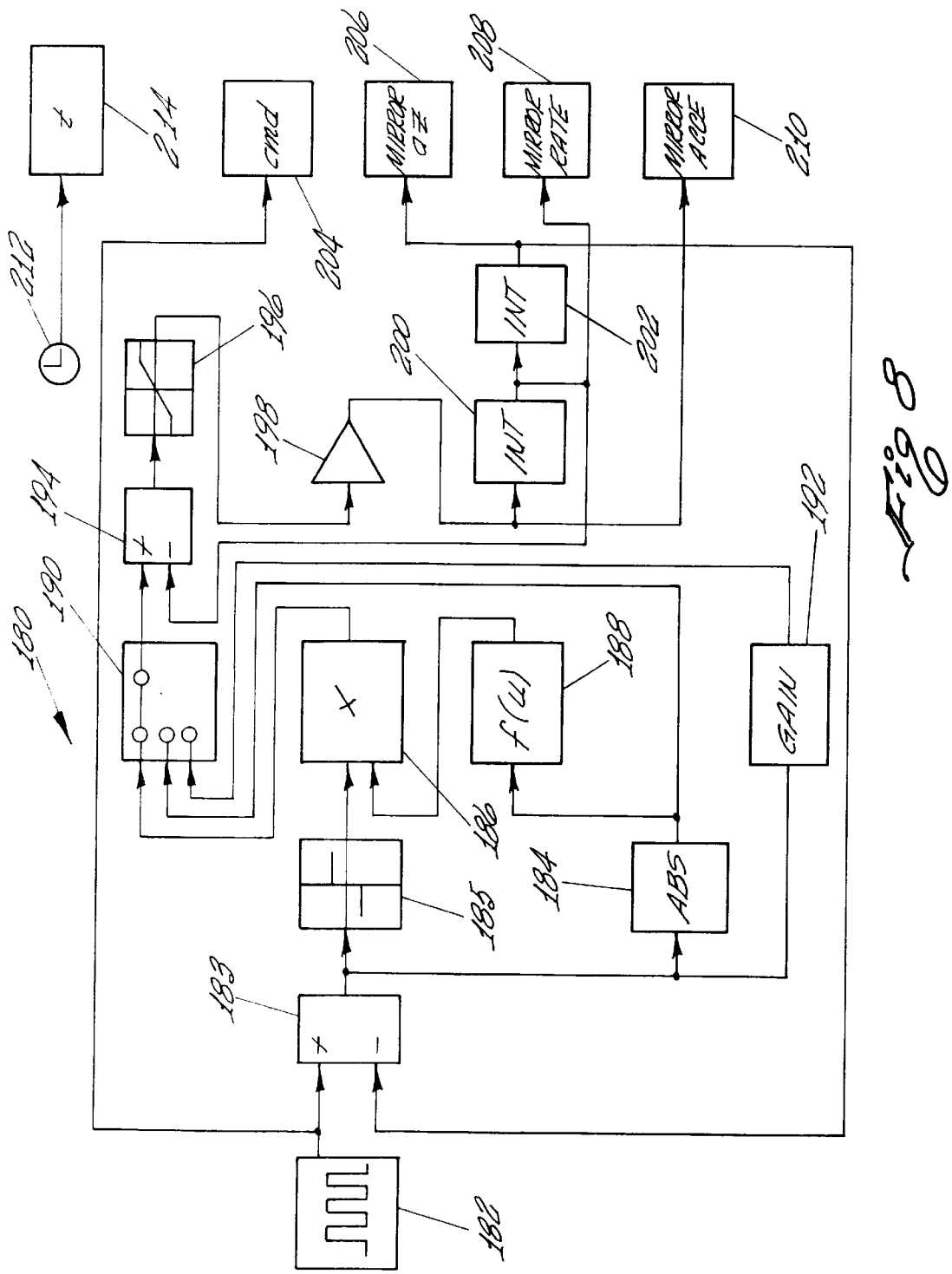
FIGS. 8 and 9 are block diagrams of the four ball joint gimbal line servos.

FIG. 8 is a model of a PTOS system implemented in the four line servos of ball joint gimballed system 20. The ball joint gimbal application requires one more enhancement to the proximal time optimal servo system. In a normal proximal time optimal servo system, a second order, double integrator plant is a part of the servomechanism "physical plant." In the ball joint gimbal system 20, this is not possible because the "physical plant" comprises the four independent line servos 30, 32, 34 and 36 and the command processing must be applied to the mirror position commands in two axis coordinates prior to their resolution into the four line servo commands. The ball joint gimbal system servos are implemented with a two-axis "model follower" approach; i.e., the double integrator part of the plant is implemented analytically in ball joint gimbal system operational software and modified mirror commands in the yaw and pitch axes are transformed into the four line length commands. Velocity and acceleration controls are applied via the proximal time optimal servo to the mirror commands such that the torque/speed limits are never exceeded in any of the four line servos. The servos thus follow the output of the plant model represented by the two analytic integrators which are integrators 200 and 202 depicted in FIG. 8.

The proximal time optimal servo system, as implemented for the ball joint gimbal system 20, is useful in shaping the command for large, discontinuous (step) commands, which without some form of command filtering, are a source of line breakage, line "whipping," loss of seating force between the mirror socket against the ball, and a geometrically uncoordinated move by the mirror in response to saturation in one or more of the line servos. The PTOS technique produces an "S" trajectory when moving the mirror between discrete positions with no discontinuities in the position-time trajectory and controllable accelerations and velocities, which are well within the current limits and rate limits of the four servo lines.

Figure 9:
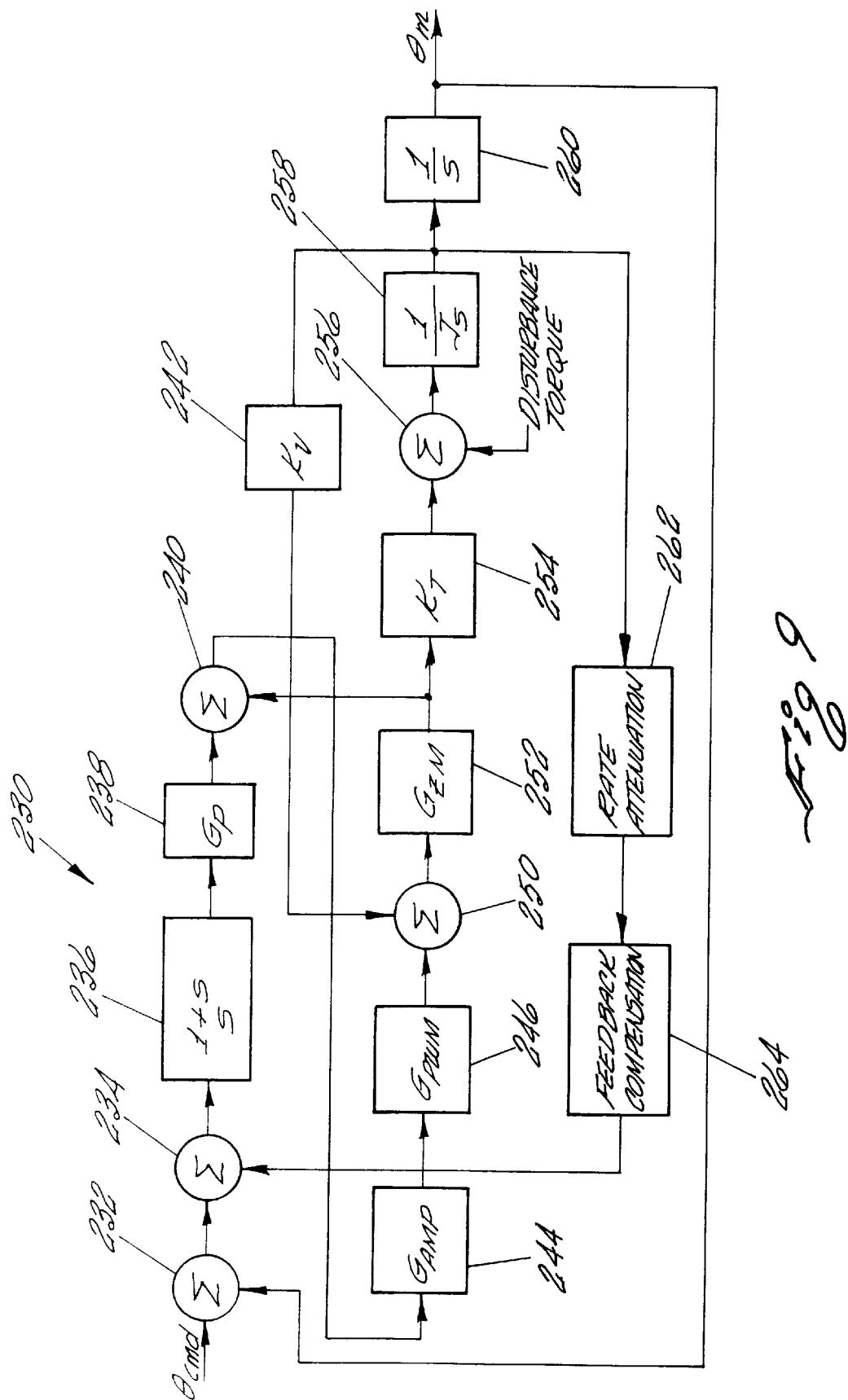

Referring to FIG. 9, using feedback to reduce the coupling of torque disturbances, which are summed to the right of Motor Torque Constant block 254, is most effective when the feedback originates to the "right" of the summation 256. It was determined that the motor rate signal, derived from the first difference of motor position, can be used to shape the loop gain curves to achieve a enhanced torque disturbance rejection. Superior torque disturbance rejection is obtained when the gain bandwidth product is maximized and the feedback does not depreciate that loop gain at higher frequencies. The rate feedback signal supplied to rate attenuator 262 is obtained from the shaft encoder 96, 106, 116 or 126 on each of the line servo motors 94, 104, 114 and 124. The encoder reading is differenced on successive samples to synthesize the shaft rate. The magnitude of this rate is attenuated by 1/600 to stabilize the loop for unity gain crossover at 1000 radians per second (rad/sec (about 160 Hz)).

The integral lead/lag compensator 236 is retained for low frequency gain, but the lead break frequency is lowered to 1 rad/sec. The effect of this compensation is diminished at 1 rad/sec.

The coupling of torque disturbance at summer 256 is generally as small of a value as possible consistent with feedback loop design. This provides for a reduced dynamic following error in mirror pointing while stabilizing the line of sight in the presence of missile body motion.

Figure 10:
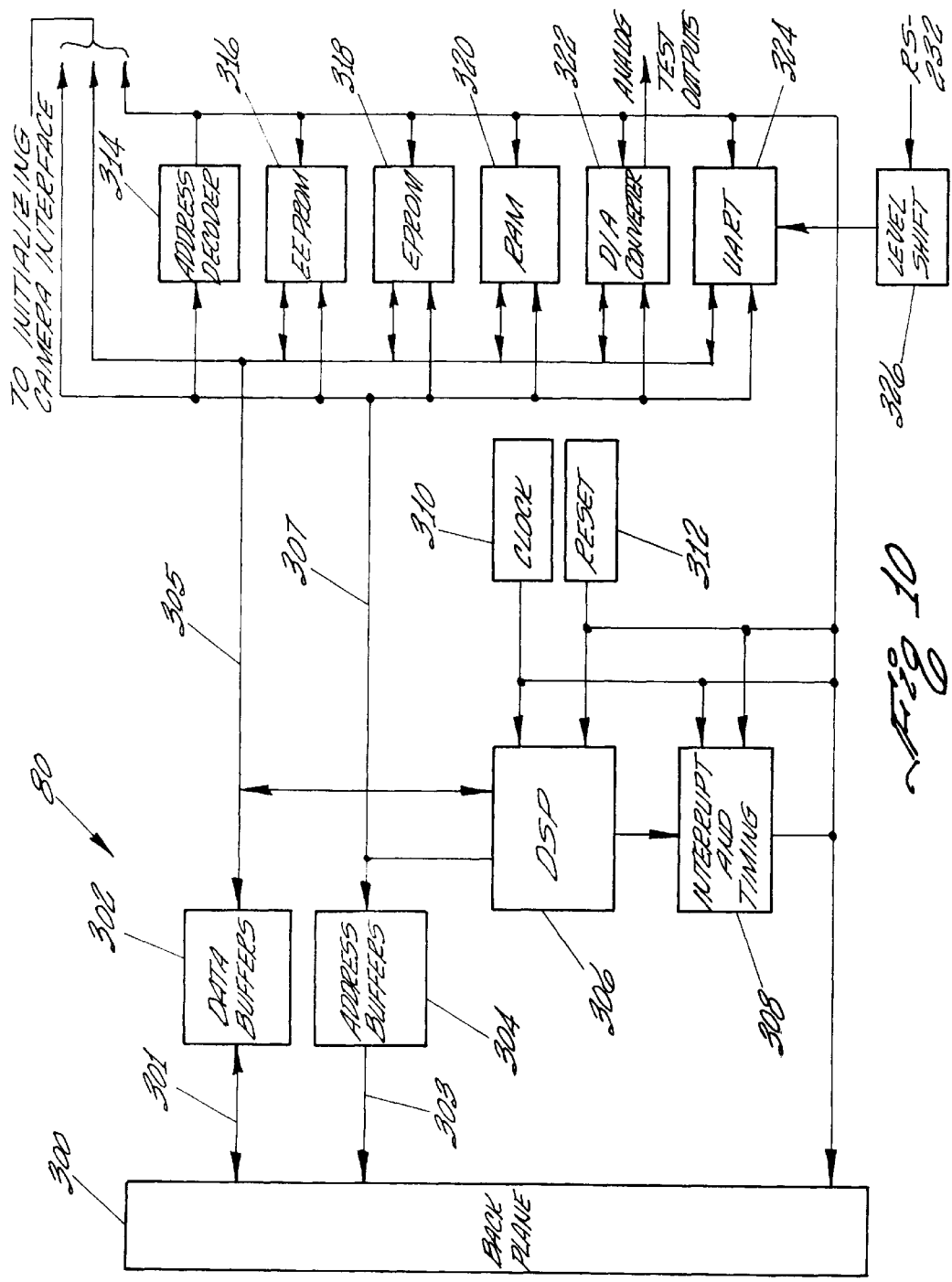
FIG. 10 is a block diagram of the central processing unit used in the ball joint gimbal system of FIG. 1.

Referring now to FIG. 10, the digital signal processing unit 80 for the ball joint gimballed system 20 of FIGS. 1 and 2 includes a 32 bit TMS320C31 digital signal processor 306 commercially available from Texas Instruments of Dallas, Tex. Processor 306 is clocked by a 48 megahertz clock 310 and has an operational capability of 24 million instructions per second and 48 million floating point operations per second. Processor 306 also has 2k words of static RAM and 24 address lines which allow it to access 16 million words of program data and I/O space. The address lines for digital signal processor 306 feed an address decoder 314 to generate the chip select signals for the electronic elements of FIG. 10. The address decoder 314 breaks a 16M address range into 33 blocks of various address bit lengths. Processor 306 is also connected to an interrupt and timing generator 308 which generates additional control signals and interrupt timing signals.

RAM 320 includes 32k words of external static RAM. On power up, code is transferred from the 128 kB program EEPROM memory 318 to the static RAM 320 and program execution is transferred from a boot loader to the newly loaded program. An 8-k block of non-volatile memory 316 is also included within digital signal processing unit 80 and is used to store system dependent information, such as mirror position correction maps and initialization camera values. A UART (universal asynchronous receiver transmitter) 324 is included within unit 80 to allow for RS-232 communications.

A four channel digital-to analog converter 322 is included within unit 80 and is used for testing to observe internal variables of the processor in real-time. For example, the user could output the encoder position of one of the four capstans 24, 26, 27 or 28 and then feed the output to a network analyzer to make bandwidth measurements of the control loop.

The 32 bit bi-directional data buffers 302 transmit data to and receive data from back plane 300 via an external data bus 301 while address information is transmitted from the 12 bit address buffers to the back plane via an external address bus 303. Data bus 305 allows for the internal transmission of data between the components of digital signal processing unit 80 while the internal transmission of address information within digital signal processing unit 80 occurs via an address bus 307.

From the foregoing, it may readily be seen that the present invention comprises a new, unique and exceedingly causeway mooring apparatus for ball joint gimbal system for steering a gimballed mirror in a missile's seeker which constitutes a considerable improvement over the known prior art. Many modifications and variations of the present invention are possible in light of the above teachings. It is to be understood that within the scope of the appended claims the invention may be practiced otherwise than as specifically described.

What is claimed is:

1. A ball joint gimbal system for use with a seeker of a missile to track a target comprising:
   a gimballed mirror positioned within the seeker of said missile for receiving image forming light from said target and then directing said image forming light along a first light path;
   a fixed mirror positioned on said first light path to receive said image forming light from said gimballed mirror and then direct said image forming light along a second light path;
   focusing optics positioned on said second light path to receive said image forming light from said fixed mirror, said focusing optics focusing said image forming light on a fixed imager positioned on said second light path;
   a ball joint rotatably coupled to said gimballed mirror to allow for rotational movement said gimballed mirror about said ball joint;
   first, second, third and fourth braided lines, each of said first, second, third and fourth braided lines having one end thereof connected to said gimballed mirror; and
   servo motor means connected to an other end of said first, second, third and fourth braided lines, said servo motor means continuously adjusting a length for each of said first, second, third and fourth braided lines to steer said gimballed mirror and maintain a line of sight to said target.

2. The ball joint gimbal system of claim 1 wherein said servo motor means comprises:
   first, second, third and fourth servo motors each having a shaft;
   first, second, third and fourth capstans, each of said first, second, third and fourth capstans being attached to the shaft of one of said first, second, third and fourth servo motors;
   said first, second, third and fourth capstans having the other end of one of said first, second, third and fourth braided lines connected thereto;
   said first, second, third and fourth servo motors rotating said first, second, third and fourth capstans to continuously adjust the length of each of said first, second, third and fourth braided lines to steer said gimballed mirror and maintain a line of sight to said target.

3. The ball joint gimbal system of claim 2 further comprising first, second, third and fourth optical shaft encoders, each of said first, second, third and fourth shaft encoders being integral with one of said first, second, third and fourth servo motors.

4. The ball joint gimbal system of claim 2 further comprising first, second, third and fourth pulleys, each of said first, second, third and fourth pulleys communicating with one of said first, second, third and fourth braided lines, each of said first, second, third and fourth pulleys being positioned between said gimballed mirror and one of said first, second, third and fourth capstans.

5. The ball joint gimbal system of claim 1 wherein each of said first, second, third and fourth braided lines comprises a KEVLAR line fabricated from 8×195 denier braided KEVLAR.

6. The ball joint gimbal system of claim 1 wherein said focusing optics comprises a lens.

7. The ball joint gimbal system of claim 1 further comprising a digital signal processor for generating first, second, third and fourth capstan angle commands, said digital signal processor providing said first, second, third and fourth capstan angle commands to said servo motor means, said servo motor means, responsive to said first, second, third and fourth capstan angle commands continuously adjusting said length for each of said first, second, third and fourth braided lines to steer said gimballed mirror and maintain said line of sight to said target.

8. The ball joint gimbal system of claim 7 wherein said digital signal processor comprises a digital computer.

9. The ball joint gimbal system of claim 1 wherein said gimballed mirror has a 3.5 inch diameter, a thickness of about 0.375 inches and is fabricated from aluminum.

10. A ball joint gimbal system for use with a seeker of a missile to track a target comprising:
    a gimballed mirror positioned within the seeker of said missile for receiving image forming light from said target and then directing said image forming light along a first light path;
    a fixed mirror positioned on said first light path to receive said image forming light from said gimballed mirror and then direct said image forming light along a second light path;
    a focusing lens positioned on said second light path to receive said image forming light from said fixed mirror, said focusing lens focusing said image forming light on a fixed imager positioned on said second light path;
    a ball joint rotatably coupled to said gimballed mirror to allow for rotational movement said gimballed mirror about said ball joint;
    first, second, third and fourth braided lines, each of said first, second, third and fourth braided lines having one end thereof connected to said gimballed mirror; and
    a position servo system connected to an other end of said first, second, third and fourth braided lines, said position servo system continuously adjusting a length for each of said first, second, third and fourth braided lines to steer said gimballed mirror and maintain a line of sight to said target;
    said position servo system including:
      first, second, third and fourth servo motors each having a shaft;
      first, second, third and fourth capstans, each of said first, second, third and fourth capstans being attached to the shaft of one of said first, second, third and fourth servo motors;
      said first, second, third and fourth capstans having the other end of one of said first, second, third and fourth braided lines connected thereto;
      said first, second, third and fourth servo motors rotating said first, second, third and fourth capstans to continuously adjust the length of each of said first, second, third and fourth braided lines to steer said gimballed mirror and maintain a line of sight to said target;
      said first, second, third and fourth servo motors each having an optical shaft encoder for measuring and then providing a sinewave signal representative of an angular position of the shaft of said first, second, third and fourth servo motor associated therewith.

11. The ball joint gimbal system of claim 10 further comprising first, second, third and fourth pulleys, each of said first, second, third and fourth pulleys communicating with one of said first, second, third and fourth braided lines, each of said first, second, third and fourth pulleys being positioned between said gimballed mirror and one of said first, second, third and fourth capstans.

12. The ball joint gimbal system of claim 10 wherein each of said first, second, third and fourth braided lines comprises a KEVLAR line fabricated from 8×195 denier braided KEVLAR.

13. The ball joint gimbal system of claim 10 further comprising a digital signal processor connected to the optical shaft encoder of each of said first, second, third and fourth servo motors to receive the sinewave signal from the optical shaft encoder of each of said first, second, third and fourth servo motors, said digital signal processor, responsive to the the sinewave signal from the optical shaft encoder of each of said first, second, third and fourth servo motors generating first, second, third and fourth capstan angle commands and providing said first, second, third and fourth capstan angle commands respectively to said first, second, third and fourth servo motors.

14. The ball joint gimbal system of claim 13 wherein said digital signal processor comprises a digital computer.

15. The ball joint gimbal system of claim 10 wherein said gimballed mirror has a 3.5 inch diameter, a thickness of about 0.375 inches and is fabricated from aluminum.

16. The ball joint gimbal of claim 13 further comprising:

first, second, third and fourth digital to analog converters connected to said digital signal processor;

first, second, third and fourth current amplifiers respectively connected to said first, second, third and fourth digital to analog converters; and said first, second, third and fourth digital to analog converters being respectively connected to said first, second, third and fourth servo motors.

17. A ball joint gimbal system for use with a seeker of a missile to track a target comprising:

a gimballed mirror positioned within the seeker of said missile for receiving image forming light from said target and then directing said image forming light along a first light path;

a fixed mirror positioned on said first light path to receive said image forming light from said gimballed mirror and then direct said image forming light along a second light path;

a focusing lens positioned on said second light path to receive said image forming light from said fixed mirror, said focusing lens focusing said image forming light on a fixed imager positioned on said second light path;

a ball joint rotatably coupled to said gimballed mirror to allow for rotational movement said gimballed mirror about said ball joint;

first, second, third and fourth braided lines, each of said first, second, third and fourth braided lines having one end thereof connected to said gimballed mirror; and a position servo system connected to an other end of said first, second, third and fourth braided lines, said position servo system continuously adjusting a length for each of said first, second, third and fourth braided lines to steer said gimballed mirror and maintain a line of sight to said target;

said position servo system including:

first, second, third and fourth servo motors each having a shaft;

first, second, third and fourth capstans, each of said first, second, third and fourth capstans being attached to the shaft of one of said first, second, third and fourth servo motors;

said first, second, third and fourth capstans having the other end of one of said first, second, third and fourth braided lines connected thereto;

said first, second, third and fourth servo motors rotating said first, second, third and fourth capstans to continuously adjust the length of each of said first, second, third and fourth braided lines to steer said gimballed mirror and maintain a line of sight to said target;

said first, second, third and fourth servo motors each having an optical shaft encoder for measuring and then providing a sinewave signal representative of an angular position of the shaft of said first, second, third and fourth servo motor associated therewith; and a digital computer connected to the optical shaft encoder of each of said first, second, third and fourth servo motors to receive the sinewave signal from the optical shaft encoder of each of said first, second, third and fourth servo motors, said digital signal processor, responsive to the sinewave signal from the optical shaft encoder of each of said first, second, third and fourth servo motors generating first, second, third and fourth capstan angle commands and providing said first, second, third and fourth capstan angle commands respectively to said first, second, third and fourth servo motors; and said first, second, third and fourth servo motors, responsive to said first, second, third and fourth capstan angle commands, rotating said first, second, third and fourth capstans to continuously adjust the length of each of said first, second, third and fourth braided lines to steer said gimballed mirror and maintain a line of sight to said target.

18. The ball joint gimbal system of claim 17 further comprising first, second, third and fourth pulleys, each of said first, second, third and fourth pulleys communicating with one of said first, second, third and fourth braided lines, each of said first, second, third and fourth pulleys being positioned between said gimballed mirror and one of said first, second, third and fourth capstans.

19. The ball joint gimbal system of claim 17 wherein each of said first, second, third and fourth braided lines comprises a KEVLAR line fabricated from 8×195 denier braided KEVLAR.

20. The ball joint gimball system of claim 17 wherein said gimballed mirror has a 3.5 inch diameter, a thickness of about 0.375 inches and is fabricated from aluminum.

* * * * *